May 1, 1951     W. S. HORTON     2,551,000
OVERRUNNING CLUTCH
Filed May 31, 1946
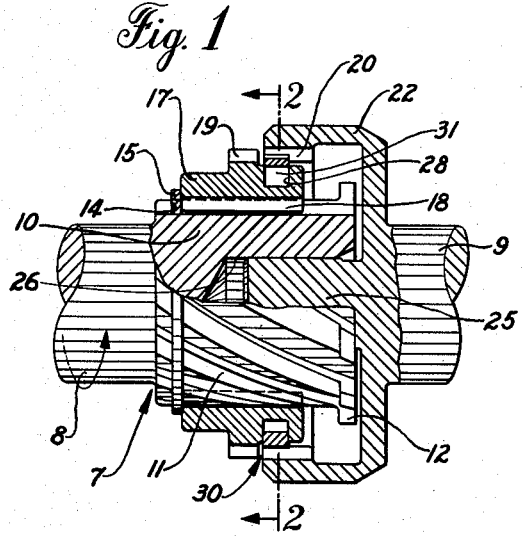
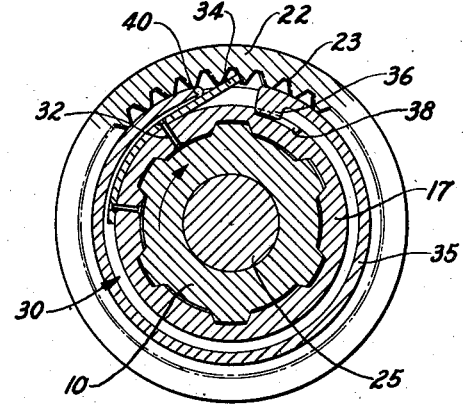
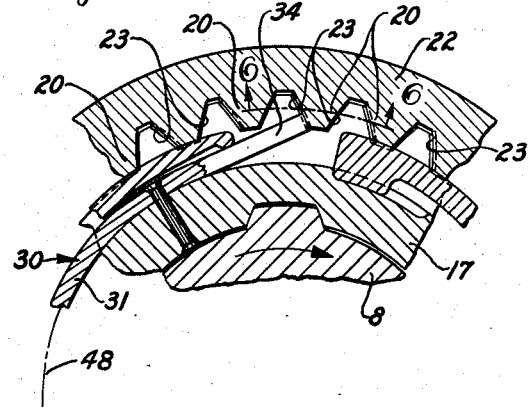
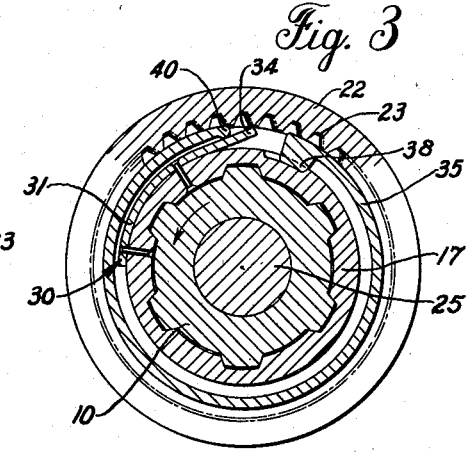
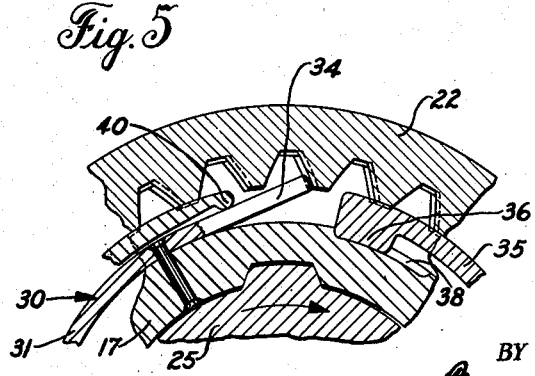
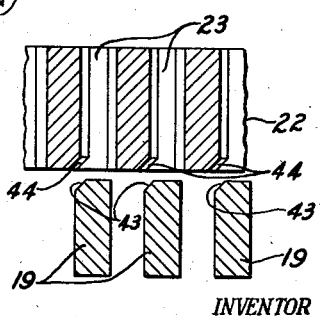
INVENTOR
Winthrop S. Horton
BY
ATTORNEYS.

Patented May 1, 1951

2,551,000

UNITED STATES PATENT OFFICE 2,551,000

OVERRUNNING CLUTCH

Winthrop S. Horton, South Bend, Ind., assignor to The Studebaker Corporation, South Bend, Ind., a corporation of Delaware Application May 31, 1946, Serial No. 673,319

7 Claims. (Cl. 192—46)

My present invention relates to an improvement in clutches, and more particularly to overrunning clutches.

Overrunning clutches are well known in the art and many forms of such devices have been proposed. My invention is primarily concerned with overrunning clutches of the positive jaw clutch type which are of advantage over other known forms of such clutches in that the clutch parts may be of small size both in diameter and axial length in transmitting heavy torque loads due to positive tooth engagement between clutch members associated with driving and driven elements. Also these clutches are of further advantage in that the parts thereof may be manufactured with standard high production rate machine tools and do not require close tolerances between the parts. These clutches are consequently cheaper to manufacture than other known forms of such devices as the ball and roller type, the sprag type or the helical coil spring type. However, the positive jaw overrunning type of clutch has not come into wide spread usage because of the difficulties encountered in effecting synchronization of the jaw clutch teeth of the clutch members associated with drive and driven elements prior to engagement of the teeth to clutch the drive and driven elements together.

It is an object of my invention to provide an overrunning clutch having a pair of jaw clutch members associated one each with drive and driven shafts or elements in which the clutch members have positive jaw clutch teeth adapted to have engagement with each other to clutch the drive and driven shafts or elements together for conjoint rotation in one direction together with means for effecting smooth meshing of the jaw clutch teeth of jaw clutch members prior to positive engagement thereof with each other.

A further object of my invention is to provide an overrunning clutch having a pair of clutch members having positive jaw clutch teeth adapted to have meshing engagement with each other to provide a positive driving relation between drive and driven shafts or elements associated with the clutch members, and which jaw clutch teeth are caused to be disengaged when the driven shaft or element overruns the drive shaft or element together with means for preventing application of driving torque to the jaw clutch teeth when engaging or disengaging with each other.

A further object of my invention is to provide an overrunning clutch as aforesaid having means providing for positioning of the positive jaw clutch teeth of a pair of clutch members in meshing relation prior to engagement so that the teeth may move into engagement at synchronous rotational speed without clash or wear, and in which the latter means for effecting meshing engagement of the clutch teeth is not subject to the driving torque between the drive and driven shafts or elements.

I propose to achieve the aforesaid objects by providing an overrunning clutch comprising a jaw clutch member adapted to have connection with a driven shaft or element and a jaw clutch collar member which is adapted to have helical connection with a drive shaft or element and in which the helical connection of the collar member provides for axial movement of the collar member toward and away from the jaw clutch member associated with the driven shaft or element. The jaw clutch member and the collar member are each provided with positive jaw clutch teeth adapted to have meshing engagement with each other. In the preferred embodiment of my invention herein disclosed I have provided a leaf spring member connected at one end to the clutch collar and with the free end of the leaf spring being in alignment with one of the positive clutch teeth of the collar member. The free end of the leaf spring member is adapted to have engagement with one of the side surfaces of one of the jaw clutch teeth of the jaw clutch member so that when the drive shaft or element is rotating in the same direction at a greater speed than the driven shaft or element the free end of the leaf spring engages one of the clutch teeth of the jaw clutch member to restrain relative rotation of the collar member with respect to the jaw clutch member. When the free end of the leaf spring so engages a tooth of the jaw clutch member, the clutch teeth between the members are aligned thus permitting meshing engagement. The collar member, while held against rotation by means of the leaf spring engaging a tooth of the jaw clutch member, is caused to be moved axially toward the jaw clutch member on the helical threads of the drive shaft disposing the jaw clutch teeth of the pair of clutch members into engagement so as to effect direct drive between the drive and driven shafts or elements. The drive shaft has a suitable stop means associated therewith so that when the clutch teeth of the collar member are in meshing engagement with the clutch teeth of the clutch member further axial movement of the collar member is arrested whereupon the drive shaft or element drives the driven shaft or element through the meshing positive clutch teeth of the pair of clutch members. Preferably the clutch teeth of the pair of clutch members are formed so that after they are disposed in meshing engagement slight relative rotational movement is effected between the collar member and the jaw clutch member to free the end of the spring member from engagement with the clutch teeth of the jaw clutch member so that when the drive and driven shafts or elements are clutched together in driving relation torque is not caused to be transmitted through the spring member. Further in such an organization of parts I provide an annular ring member which is adapted to have frictional engagement with the teeth of the jaw clutch member and which ring member is mounted for limited rotational movement with respect to the jaw clutch collar so that when the driven shaft or element tends to overrun the drive shaft or element the ring member is caused to be rotated a limited amount. This movement of the ring member is effective to wrap the leaf spring member about the collar member to position the free end thereof away from the clutch teeth of the jaw clutch member. Upon overrunning of the driven shaft or element with respect to the drive shaft or element the clutch collar is caused to be moved axially away from the jaw clutch member on the helical threads of the drive shaft disposing the jaw clutch teeth of the pair of clutch members out of engagement so that the shafts or elements are in overrunning relation.

Suitable stop means is associated with the drive shaft or element to limit the outward movement of the clutch collar away from the jaw clutch member to a position in which wrapped down leaf spring is disposed interiorly of the clutch teeth of the jaw clutch member so that upon relative rotation between the shafts indicating a driving connection from the drive shaft to the driven shaft the ring member rotates slightly to release the spring so that its free end may engage one of the clutch teeth of the jaw clutch member whereupon the collar member again moves axially of the drive shaft and toward the jaw clutch member to effect positive driving engagement between the pair of shafts or elements.

A preferred feature of the embodiment of my invention herein disclosed resides in providing the pair of jaw clutch members with jaw clutch teeth having side surfaces of involute form with these surfaces being described or generated from a base circle falling within the thickness of the leaf spring so that the free end of the latter will follow the generated involute in unwrapping and thus within close limits effect proper registration of the free end of the spring with one of the teeth of the jaw clutch member to prevent a racheting effect of the free end of the leaf spring member with the jaw clutch teeth of the jaw clutch member.

The above and other objects, advantages and features of my invention will appear from the detail description.

Now in order to acquaint those skilled in the art with the manner of constructing and utilizing overrunning clutches in accordance with the principles of my present invention, I shall describe in connection with the accompanying drawings a preferred embodiment of my invention.

In the drawings:

Figure 1 is a detail vertical sectional view of an overrunning clutch constructed in accordance with the principles of my present invention with certain of the parts being shown in elevation and showing the position of the parts with the clutch disengaged;

Figure 2 is a detail vertical sectional view taken substantially on line 2—2 of Figure 1 looking in the direction indicated by the arrows illustrating the position of the parts when the clutch is being caused to be engaged;

Figure 3 is a view similar to Figure 2 but showing the position of the parts when the driven shaft overruns the drive shaft of the embodiment of Figure 1;

Figure 4 is an enlarged partial fragmentary sectional view illustrating the position of the parts at the beginning of engagement of the clutch teeth of the clutch members in clutching of the driven shaft or element with the drive shaft or element;

Figure 5 is an enlarged fragmentary sectional view similar to Figure 4 showing the position of the parts when the clutch teeth of the pair of clutch members are in full clutching engagement; and Figure 6 is a developed sectional view taken substantially along the line 6—6 of Figure 4 looking in the direction indicated by the arrows and showing the manner in which meshing engagement of the clutch teeth between the clutch members is effected and with the jaw clutch teeth of the clutch members being formed to provide for effecting disengagement of the free end of the leaf spring member after meshing engagement of the clutch teeth.

Referring now to Figures 1 and 2 I have shown an overrunning clutch 7 associated with a drive shaft or drive element 8 and a driven shaft or element 9. The shafts 8 and 9 are disposed co-axially of each other and the drive shaft 8 is provided with an enlarged outer end portion 10 formed with a plurality of helical splines 11 at the outer end of which an enlarged radial flange 12 forms a stop means or an abutment collar. The enlarged portion 10 adjacent the inner end thereof is formed with a groove 14 cut substantially to the root diameter of the splines 11 and in which groove a split ring 15 is disposed and which serves as a second stop or abutment for a clutch collar member 17. The clutch collar 17 is formed with internal helical splines 18 matching with the splines 11 of the drive shaft and in slidable relation thereto. The collar 17 as shown is provided with a plurality of uniformly circumferentially spaced positive clutch teeth 19 adapted to have meshing engagement with the clutch teeth 20 of a jaw clutch member 22 which in the embodiment herein shown of my present invention is formed integral with the driven shaft 9. The clutch teeth 19 of the collar member 17 are suitably formed so as to fit freely within the tooth spaces 23 of the jaw clutch teeth 20 of the jaw clutch member 22. The driven shaft 9, as shown, is provided with a reduced annular bearing portion 25 at its inner end which is journalled in a bore 26 extending inwardly of the outer end of the drive shaft 8 to provide for maintaining the drive and driven shafts in alignment co-axially of each other. It will be understood that other bearing means are provided between the shafts for maintaining the positive jaw clutch teeth of the jaw clutch collar member 17 and the jaw clutch member 22 in alignment. It will be understood that the formation of the bearing portion 25 having bearing engagement in the bore 26 of the drive shaft is illustrative of one typical construction for arranging the adjacent ends of the shafts with respect to each other, but that this mounting relation of the shafts with respect to each other may vary widely. The collar member 17 adjacent its outer end is provided with an annular groove 28 extending radially inwardly of the space width of the positive jaw clutch teeth of the jaw clutch member 22. A synchronizing means indicated generally at 30 is adapted to be disposed within the groove 28, and which synchronizing means 30 in the embodiment of my invention herein disclosed comprises a leaf spring member 31 fixed at one end as by a plurality of rivets 32 to the collar 17 at the bottom of the groove thereof with the free end 34 of the leaf spring 31 in alignment with one of the side surfaces of one of the clutch teeth 19 of the collar member 17. A split ring member 35 is also disposed within the groove 28 and its outer periphery is in frictional engagement with the inside end surfaces of the clutch teeth 20 of the jaw clutch member 22. One end of the split ring member 35 is provided with an integral lug portion 36 fitting in a groove 38 formed in the external surface of the base of the groove 28 of the collar member 17 to permit limited relative rotation of the ring member 35 as determined by the length of the groove 38 with respect to the collar member 17. The other end of the ring member 35 is provided with a nose portion 40 adapted to have contacting engagement with the free end portion 34 of the leaf spring member 31 and which in the position shown in Figure 2 with the lug portion 36 of the split ring member 35 at one end of the slot 38 permits the leaf spring 31 to unwrap or bias itself outwardly so that its free end is disposed in position to engage the side surface of one of the clutch teeth 20 of the jaw clutch member 22. Upon movement of the split ring member 35 to the position thereof shown in Figure 3 and in which the lug element 36 is disposed at the other end of the groove 38 in the collar 17 it will be observed that the nose portion 40 effects wrapping radially inwardly of the free end portion 34 of the leaf spring member to prevent engagement of the free end thereof with the side surfaces of the jaw clutch teeth 20 of the jaw clutch member 22.

The operation of the device is as follows:

Referring now to Figure 4 and assuming that the drive shaft 8 is rotating in the direction indicated by the arrows and at a greater rate of speed than the driven shaft 9 and the jaw clutch member 22 it will be observed that the free end of the leaf spring 31 is in engagement with one of the side surfaces of one of the clutch teeth 20 of the jaw clutch member 22 which engagement of the leaf spring member prevents relative rotation of the collar 17 with respect to the jaw clutch member 22. The collar member 17 is caused to be moved axially of the drive shaft 8 by means of the helical connection therebetween toward the jaw clutch member 22. It will be observed that when the collar member 17 is moving axially of the drive shaft 8 toward the jaw clutch member 22 that no torque load is imposed on the collar member. Since the free end of the leaf spring member 34 is in alignment with one of the jaw clutch teeth 19 of the collar 17, the clutch teeth 19 will mesh in the tooth spaces 23 between the clutch teeth 20 of the jaw clutch member 22 and when the collar member abuts the stop 12 further axial movement of the collar member is arrested and positive driving relation is established from the drive shaft 8 to the driven shaft 9. Referring now to Figure 6 it will be observed that the jaw clutch teeth 19 are formed with chamfered end portions 43 which are adapted to have engagement with correspondingly chamfered portions 44 of the jaw clutch teeth 20 of the jaw clutch member 22 so that upon meshing engagement of the jaw clutch teeth with each other limited relative rotation is effected between the collar member 17 and the jaw clutch member 22 of an amount sufficient to free the free end of the leaf spring member 31 from abutting engagement with the adjacent side surface of one of the jaw clutch teeth 20 of the jaw clutch member 22. Thus after meshing of the jaw clutch no driving torque is transmitted through the leaf spring 31.

Now, assuming that the driven shaft 9 begins to overrun the drive shaft 8 it will be observed that, as viewed in Figure 3, the split ring member 35 due to its frictional engagement with the inner end portions of the jaw clutch teeth 20 is caused to be rotated relative to the clutch collar member 17 a limited amount as permitted by the lug 36 in groove 38 causing the nose portion 40 to engage the free end portion 34 of the leaf spring member 31 to wrap the latter radially inwardly to a position where it is prevented from engaging the side surfaces of the jaw clutch teeth 20 of the jaw clutch member 22. When the parts have assumed the position shown in Figure 3 and with the driven shaft 9 overrunning the drive shaft 8 the clutch collar member 17 moves axially along the drive shaft member away from the jaw clutch member 22 disengaging the jaw clutch teeth 19 from the jaw clutch 20 and thereby disengaging the drive and driven shafts from each other. The split ring 15 provides a stop to limit the axial outward movement of the collar 17 from the jaw clutch member 22 to a position in which the wrapped down leaf spring 31 is disposed radially within the jaw clutch teeth 20 of the jaw clutch member 22 so that when the drive shaft 8 begins to overtake the driven shaft 9 the ring member 35 will be caused to be rotated to the position shown in Figure 2 to free the end of the leaf spring member 34 for engagement with one of the side surfaces of one of the clutch teeth 20 to again effect meshing engagement of the jaw clutch teeth 20 of the jaw clutch member 22 to again provide a positive clutching engagement between the drive and driven shafts.

As above related Figure 2 illustrates the position of the parts wherein the drive shaft 8 is rotating faster than the driven shaft 9 so that in the direction of the drive shaft 8 as indicated in Figure 1 the drive shaft 8 is rotating clockwise relative to the driven shaft 9 as indicated by the arrow in Figure 2.

In Figure 3 the position of the parts is that when the driven shaft 9 is rotating faster than the drive shaft 8 so that in effect the relative rotation of the drive shaft is opposite to that of Figure 2 as indicated by the arrow in Figure 3.

In the preferred embodiment of my invention herein disclosed I provide the clutch teeth 19 and 20 with side surfaces of involute form generated from a base circle 48 the radius of which falls within the thickness of the leaf spring member 31 so that the free end of the leaf spring 31 will operate along an involute in unwrapping and which involute corresponds to the involute form of the side surfaces of the clutch teeth so that within close limits the free end of the leaf spring 31 in moving radially outwardly will immediately engage one of the side surfaces of one of the clutch teeth 20 of the collar member 22. This construction is of advantage in that substantially regardless of where the free end of the leaf spring member 31 engages one of the jaw clutch teeth 20 slippage of the free end of the leaf spring to the succeeding tooth space will be prevented and thus avoid undue wearing of the free end of the leaf spring member 31.

Also it will be understood that while I prefer to provide the clutch teeth with the chamfered portions 43 and 44 for effecting disengagement of the free end of the leaf spring with the clutch teeth 20 of the jaw clutch member 22 upon meshing engagement of the clutch teeth that this may be achieved by other means as, for example, by forming the clutch teeth at a small helix angle.

While I have shown what I consider to be the preferred embodiment of my invention it will be understood that various modifications and rearrangements may be made therein without departing from the spirit and scope of my invention.

I claim:

1. An overrunning clutch for use between drive and driven elements comprising a jaw clutch member having connection with one of said elements, a clutch collar member having helical connection with the other of said elements for movement toward and away from said jaw clutch member, said jaw clutch member and said collar member having positive clutch teeth adapted to have meshing engagement with each other, tooth engaging means carried by said collar member adapted to engage one of the clutch teeth of said jaw clutch member for restraining rotation of said collar member upon movement thereof toward said jaw clutch member and aligning the clutch teeth of said collar member with the clutch teeth of said jaw clutch member for meshing engagement, means between said clutch teeth of said members for effecting disengagement of said last named means with said one of the teeth of said jaw clutch member upon meshing of the clutch teeth of said members with each other, and means between said collar member and said jaw clutch member for permitting movement of said collar member away from said jaw clutch member when said one element is in overrunning relation with respect to said other element, and for preventing engagement of said tooth engaging means with the clutch teeth of said jaw clutch member.

2. An overrunning clutch for use between drive and driven elements comprising a jaw clutch member having connection with one of said elements, a clutch collar member, said jaw clutch member and said clutch collar member having positive clutch teeth adapted to have meshing engagement with each other, means between said other element and said clutch collar member for effecting axial movement of the latter toward said jaw clutch member upon relative rotation in one direction of said other element with respect to said one element, and away from said jaw clutch member upon relative rotation in the other direction of said other element with respect to said one element, means comprising a spring member fixed at one end to said clutch collar member and having its free end in alignment with one of the clutch teeth of said clutch collar member, said free end of said spring member being adapted to engage normally one of the clutch teeth of said jaw clutch member upon relative rotation of said other element with respect to said one element so that the clutch teeth of said members are adapted to be aligned for meshing engagement upon movement of said clutch collar member toward said jaw clutch member to clutch said elements together, means for biasing said free end of said spring member out of position to engage the clutch teeth of said jaw clutch member upon relative rotation in the other direction of said other element with respect to said one element upon axial movement of said clutch collar member away from said jaw clutch member to disengage the clutch teeth of said members, and said clutch teeth of said members having means for effecting disengagement of the free end of said spring member with said one of the clutch teeth of said jaw clutch member upon effecting of meshing engagement of said clutch teeth of said members with each other.

3. An overrunning clutch for use between drive and driven shafts comprising a jaw clutch member having connection with said driven shaft, a clutch collar member having helical splined connection with said drive shaft for movement axially thereof between a pair of stops toward and away from said jaw clutch member, said jaw clutch member and said clutch collar member having positive jaw clutch teeth adapted to have meshing engagement with each other, a spring member fixed at one end to said clutch collar member with its free end in alignment with one of the clutch teeth thereof and normally disposed in position to engage one of the clutch teeth of said jaw clutch member whereby upon rotation of said drive shaft relative to said driven shaft said collar member is adapted to move toward said jaw clutch member and effect meshing engagement of said clutch teeth of said members to clutch them together for rotation, and a ring member mounted for limited rotation with respect to said clutch collar member and in frictional engagement with the clutch teeth of said jaw clutch member adapted upon rotation of said driven shaft relative to said drive shaft to bias the free end of said spring member out of its normal position and away from the clutch teeth of said jaw clutch member and permit movement of said clutch collar member axially of said drive shaft and away from said jaw clutch member to disengage the clutch teeth of said members.

4. An overrunning clutch for use between drive and driven shafts comprising a jaw clutch member having connection with said driven shaft, a clutch collar member having helical splined connection with said drive shaft for movement axially thereof between a pair of stops toward and away from said jaw clutch member, said jaw clutch member and said clutch collar member having positive jaw clutch teeth adapted to have meshing engagement with each other, a spring member fixed at one end to said clutch collar member with its free end in alignment with one of the clutch teeth thereof and normally disposed in position to engage one of the clutch teeth of said jaw clutch member whereby upon rotation of said drive shaft relative to said driven shaft said collar member is adapted to move toward said jaw clutch member and effect meshing engagement of said clutch teeth of said members to clutch them together for rotation, and a split ring member having one end mounted in a groove in said clutch collar member for limited rotational movement with respect thereto and with its other end overlying said spring member, said ring member having frictional engagement with the clutch teeth of said jaw clutch member and adapted upon rotation of said driven shaft relative to said drive shaft to rotate relative to said clutch collar member with said other end thereof biasing said free end of said spring member inwardly of said clutch collar member and away from the clutch teeth of said jaw clutch member, whereby said ring member is adapted to permit movement of said clutch collar member axially of said drive shaft away from said jaw clutch member to disengage the clutch teeth of said members.

5. An overrunning clutch for use between drive and driven shafts comprising a jaw clutch member having connection with said driven shaft, a clutch collar member having helical splined connection with said drive shaft for movement axially thereof between a pair of stops toward and away from said jaw clutch member, said jaw clutch member and said clutch collar member having positive jaw clutch teeth adapted to have meshing engagement with each other, a spring member fixed at one end to said clutch collar member with its free end in alignment with one of the clutch teeth thereof and normally disposed in position to engage one of the clutch teeth of said jaw clutch member whereby upon rotation of said drive shaft relative to said driven shaft said collar member is adapted to move toward said jaw clutch member and effect meshing engagement of said clutch teeth of said members to clutch them together for rotation, said clutch teeth of said members being formed upon meshing engagement thereof to effect limited relative rotational movement of said members with respect to each other to free the end of said spring member from engagement with said one of the clutch teeth of said jaw clutch member, and a ring member mounted for limited rotation with respect to said clutch collar member and in frictional engagement with the clutch teeth of said jaw clutch member adapted upon rotation of said driven shaft relative to said drive shaft to bias the free end of said spring member out of its normal position and away from the clutch teeth of said jaw clutch member and permit movement of said clutch collar member axially of said drive shaft and away from said jaw clutch member to disengage the clutch teeth of said members.

6. An overrunning clutch for use between drive and driven shafts comprising a jaw clutch member having connection with said driven shaft, a clutch collar member having helical splined connection with said drive shaft for movement axially thereof between a pair of stops toward and away from said jaw clutch member, said jaw clutch member and said clutch collar member having positive jaw clutch teeth adapted to have meshing engagement with each other, a spring member fixed at one end to said clutch collar member with its free end in alignment with one of the clutch teeth thereof and normally disposed in position to engage one of the clutch teeth of said jaw clutch member whereby upon rotation of said drive shaft relative to said driven shaft said collar member is adapted to move toward said jaw clutch member and effect meshing engagement of said clutch teeth of said members to clutch them together for rotation, said clutch teeth of said members being formed with chamfered portions adapted to engage with each other upon meshing thereof to effect limited relative rotational movement of said members with respect to each other to free the end of said spring member from engagement with said one of the clutch teeth of said jaw clutch member, and a split ring member having one end mounted in a groove in said clutch collar member for limited rotational movement with respect thereto and with its other end overlying said spring member, said ring member having frictional engagement with the clutch teeth of said jaw clutch member and adapted upon rotation of said driven shaft relative to said drive shaft to rotate relative to said clutch collar member with said other end thereof biasing said free end of said spring member inwardly of said clutch collar member and away from the clutch teeth of said jaw clutch member, whereby said ring member is adapted to permit movement of said clutch collar member axially of said drive shaft away from said jaw clutch member to disengage the clutch teeth of said members.

7. An overrunning clutch for use between drive and driven shafts comprising a jaw clutch member having connection with said driven shaft, a clutch collar member having helical splined connection with said drive shaft for movement axially thereof between a pair of stops toward and away from said jaw clutch member, said jaw clutch member and said clutch collar member having positive jaw clutch teeth adapted to have meshing engagement with each other, a leaf spring member fixed at one end to said clutch collar member with its free end in alignment with one of the clutch teeth thereof and normally disposed in position to engage one of the clutch teeth of said jaw clutch member whereby upon rotation of said drive shaft relative to said driven shaft said collar member is adapted to move toward said jaw clutch member and effect meshing engagement of said clutch teeth of said members to clutch them together for rotation, and a ring member mounted for limited rotation with respect to said clutch collar member and in frictional engagement with the clutch teeth of said jaw clutch member adapted upon rotation of said driven shaft relative to said drive shaft to contract said leaf spring circularly about said clutch collar member and away from the clutch teeth of said jaw clutch member and permit movement of said clutch collar member axially of said drive shaft away from said jaw clutch member to disengage the clutch teeth of said members, said clutch teeth surfaces being generated from a base circle of a radius extending from the axis of said drive shaft and terminating within the thickness of said leaf spring at its fixed end, whereby upon rotation of said drive shaft relative to said driven shaft said ring member is caused to be rotated a limited amount of freeing said leaf spring member with the same returning to its normal position along the generated involute of said jaw clutch teeth of said members to engage one of the jaw clutch teeth of said clutch collar member.

WINTHROP S. HORTON.

REFERENCES CITED

The following references are of record in the file of this patent:

UNITED STATES PATENTS

| Number | Name | Date |
|---|---|---|
| 1,937,235 | Lansing et al. | Nov. 28, 1933 |
| 2,224,322 | Sinclair | Dec. 10, 1940 |
| 2,399,098 | Carnagua et al. | Apr. 23, 1946 |
| 2,433,428 | Carnagua et al. | Dec. 30, 1947 |